(12) United States Patent
Boniface (10) Patent No.: US 10,669,949 B2
(45) Date of Patent: Jun. 2, 2020

(54) GAS TURBINE ENGINE WITH A GEARED TURBOFAN ARRANGEMENT

(71) Applicant: Rolls-Royce Deutschland Ltd & Co KG, Blankenfelde-Mahlow (DE)

(72) Inventor: Dominic Boniface, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 462 days.

(21) Appl. No.: 15/647,953

(22) Filed: Jul. 12, 2017

(65) Prior Publication Data

US 2018/0080387 A1    Mar. 22, 2018

(30) Foreign Application Priority Data

Sep. 20, 2016 (EP) .................................... 16189699

(51) Int. Cl.
*F02C 7/36* (2006.01)
*F01D 21/04* (2006.01)
(Continued)

(52) U.S. Cl.
CPC ................ *F02C 7/36* (2013.01); *B64D 35/02* (2013.01); *F01D 21/04* (2013.01); *F02C 3/107* (2013.01);
(Continued)

(58) Field of Classification Search
CPC ......... B64D 35/02; B64D 35/04; F01D 21/04; F01D 21/045; F01D 21/06; F01D 21/08;
(Continued)

(56) References Cited

U.S. PATENT DOCUMENTS

| 3,997,042 A | 12/1976 | Langham |
| 4,270,408 A | 6/1981 | Wagner |

(Continued)

FOREIGN PATENT DOCUMENTS

| DE | 102011084360 A1 | 4/2013 |
| EP | 2199568 A2 | 6/2010 |

(Continued)

OTHER PUBLICATIONS

European Search Report dated Mar. 30, 2017 for counterpart European Application No. 16189699.8.

(Continued)

*Primary Examiner* — Jacob S. Scott
(74) *Attorney, Agent, or Firm* — Shuttleworth & Ingersoll, PLC; Timothy J. Klima (57) ABSTRACT

A gas turbine engine with a geared turbofan arrangement with a gearbox in a drive train driven by a turbine, a driving side of the gearbox being driveably connected with a propulsive fan, is provided. The gas turbine includes at least one form locking connection device in a drive train enabling a controlled disengagement of at least one engine part from the drive train in case of a mechanical failure of the gas turbine engine or a part thereof and wherein the at least one form locking connection device is positioned in a torque carrying shaft or a torque carrying part of a shaft and/or wherein the at least one form locking connection device is positioned between the torque bearing coupling of the gearbox with the fan shaft and a torque carrier of the gearbox and at least one load stop for bearing an essential axial load.

15 Claims, 6 Drawing Sheets

(51) Int. Cl.
*F02C 3/107* (2006.01)
*B64D 35/02* (2006.01)
*F02K 3/06* (2006.01)

(52) U.S. Cl.
CPC ........ *F02K 3/06* (2013.01); *F05D 2260/4023* (2013.01); *F05D 2260/4031* (2013.01); *F05D 2270/021* (2013.01); *F05D 2270/09* (2013.01); *F05D 2270/46* (2013.01); *F16H 2306/44* (2013.01)

(58) Field of Classification Search
CPC .. F01D 21/14; F02C 3/04; F02C 3/045; F02C 3/10; F02C 3/107; F02C 3/113; F02C 7/36; F02K 3/02–077; F05D 2260/4023; F05D 2260/4031; F05D 2270/021; F05D 2270/09; F05D 2270/46
See application file for complete search history.

(56) References Cited

U.S. PATENT DOCUMENTS

| | | | |
|---|---|---|---|
| 4,452,567 | A | 6/1984 | Treby et al. |
| 5,533,825 | A | 7/1996 | Stone |
| 6,428,269 | B1 | 8/2002 | Boratgis et al. |
| 7,716,914 | B2 | 5/2010 | Schilling |
| 7,882,693 | B2 | 2/2011 | Schilling |
| 8,621,871 | B2 | 1/2014 | McCune et al. |
| 9,353,690 | B2 | 5/2016 | Makulec et al. |
| 2002/0069637 | A1 | 6/2002 | Becquerelle et al. |
| 2003/0210979 | A1 | 11/2003 | Doerflein et al. |
| 2004/0006967 | A1 | 1/2004 | Clark |
| 2005/0193715 | A1 | 9/2005 | Opper |
| 2005/0220384 | A1 | 10/2005 | Plona |
| 2007/0084183 | A1 | 4/2007 | Moniz et al. |
| 2008/0098717 | A1 | 5/2008 | Orlando et al. |
| 2008/0120839 | A1 | 5/2008 | Schilling |
| 2010/0132369 | A1 | 6/2010 | Durocher et al. |
| 2013/0199206 | A1 | 8/2013 | Cigal et al. |
| 2014/0271135 | A1 | 9/2014 | Sheridan et al. |
| 2016/0130975 | A1 | 5/2016 | Chilton et al. |
| 2016/0160875 | A1 | 6/2016 | Schwarz |
| 2017/0081973 | A1 | 3/2017 | Swift et al. |
| 2017/0082065 | A1 | 3/2017 | Swift et al. |
| 2017/0175753 | A1 | 6/2017 | Tan-Kim et al. |
| 2018/0080387 | A1 | 3/2018 | Boniface |

FOREIGN PATENT DOCUMENTS

| | | |
|---|---|---|
| EP | 2415991 A2 | 2/2012 |
| EP | 2535528 A2 | 12/2012 |
| EP | 2360391 B1 | 4/2014 |
| EP | 2884056 A1 | 6/2015 |
| EP | 2998557 A1 | 3/2016 |
| EP | 3121469 A1 | 1/2017 |
| FR | 3022890 A1 | 1/2016 |
| GB | 2487551 A | 8/2012 |

OTHER PUBLICATIONS

European Search Report dated Mar. 24, 2017 for related European Application No. 16189712.9.
European Search Report dated Mar. 16, 2017 for related European Application No. 16189708.7.
European Search Report dated Mar. 23, 2017 for related European Application No. 16189697.2.
Gideon Venter—U.S. Appl. No. 15/646,775, filed Jul. 11, 2017.
Dominic Boniface—U.S. Appl. No. 15/708,716, filed Sep. 19, 2017.
Dominic Boniface—U.S. Appl. No. 15/707,471, filed Sep. 18, 2017.

GAS TURBINE ENGINE WITH A GEARED TURBOFAN ARRANGEMENT

REFERENCE TO RELATED APPLICATION

This application claims priority to European Patent Application No. 16 189 699.8 filed on Sep. 20, 2016, the entirety of which is incorporated by reference herein.

BACKGROUND

The invention relates to a gas turbine engine with a geared turbofan arrangement.

Gas turbine engines with geared turbofan arrangements, in particular aircraft engines, require some means to mitigate damages that might occur after a failure. A failure might involve the rotation prevention of at least one part of the drive train. Such a failure might be e.g. a shaft breaking, a rotor-casing contact or a bearing seizure.

SUMMARY

Therefore, gas turbine engines with an improved resilience are required.

This is addressed by a gas turbine engine with a geared turbofan arrangement with a gearbox in a drive train driven by a turbine, a driving side (i.e. the output side) of the gearbox being driveably connected with a propulsive fan, with at least one form locking connection device in a drive train enabling a controlled disengagement of at least one engine part from the drive train in case of a mechanical failure of the gas turbine engine or a part thereof and at least one load stop for bearing an essentially axial load in case of the mechanical failure of the gas turbine or a part thereof.

In a first variant, the at least one form locking connection device is positioned in a torque carrying shaft or a torque carrying part of a shaft, in particular a torque bearing coupling with the gearbox and/or the at least one form locking connection device is positioned between the torque bearing coupling of the gearbox with a fan shaft and a torque carrier of the gearbox.

In a second variant, the at least one form locking connection device is positioned in a non-torque carrying shaft, in particular a thrust shaft behind a fan catcher. These positions are especially suited for a controlled disengagement of the propulsive fan from the drive train.

The form locking connection device can be e.g. a clutch or a spline connection for a controlled release of the rotating parts. It is possible that two different form locking connection devices can work together to release e.g. the fan shaft from the gearbox output (torque carrier) and the thrust shaft, such that it is no longer axially constrained or torsionally connected to the gearbox.

In particular, the clutch connection can be released through a torque above a certain threshold value, a change in the direction of the torque, a hydraulic pressure and/or an electronic activation.

In a third variant, at least one load stop is positioned between a torque carrying part of a shaft, in particular the torque bearing coupling of the gearbox to the fan shaft to engage a part moving part of the gas turbine engine after the mechanical failure. In particular, at least one load stop is designed for retaining the propulsive fan in the gas turbine engine and/or for directing loads away from the gearbox.

To keep the thrust shaft in a secure and rotatable position in one embodiment the thrust shaft comprises and/or is contacting guiding means ("bumpers") to allow rotation under thrust shaft deflection occurring under a failure mode.

Furthermore, it is possible that an embodiment uses detection means for an overspeeding of a shaft, in particular the intermediate pressure shaft. The detection means are usually present in a gas turbine engine for other purposes. The signal regarding an overspeeding can be used to detect a shaft break and subsequently the engine will be shut down automatically.

Another embodiment comprises a reference shaft for the detection of shaft break. The rotational speed of the reference shaft is measured. If there is a difference in the rotational speed of a driving shaft, this is an indication that a breakage has occurred.

BRIEF DESCRIPTION OF THE DRAWINGS

Embodiments of the invention are shown in the figures.

DETAILED DESCRIPTION

Figure 1:
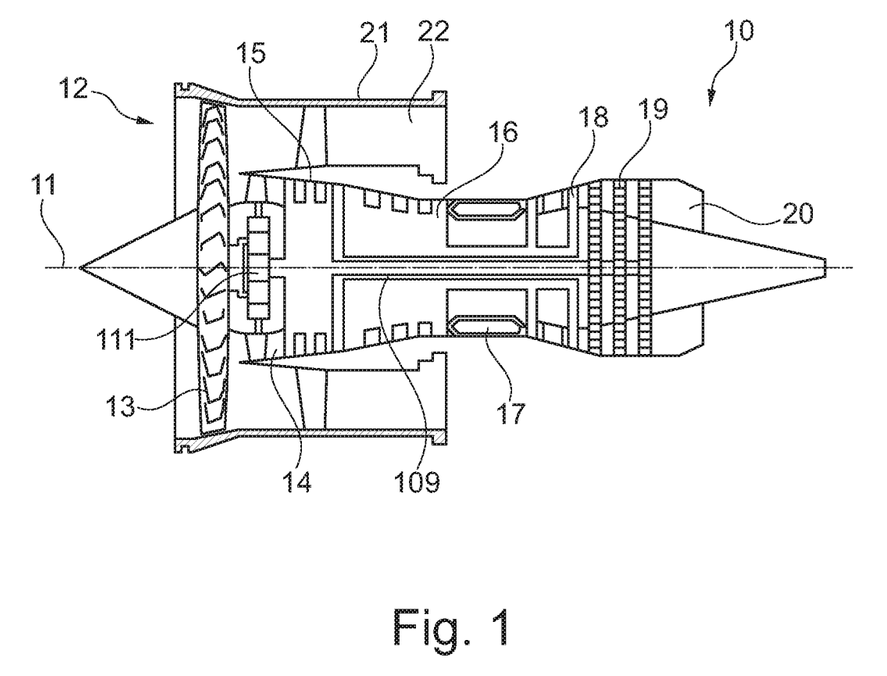
FIG. 1 shows a schematic drawing of a gas turbine engine according to the prior art.

With reference to FIG. 1, a gas turbine engine is generally indicated at 10, having a principal and rotational axis 11. The engine 10 comprises, in axial flow series, an air intake 12, a propulsive fan 13 (could be more than one stage), a gearbox 14, an intermediate pressure compressor 15, a high-pressure compressor 16, a combustion equipment 17, a high-pressure turbine 18, an intermediate-pressure turbine 19 and an exhaust nozzle 20. A fan casing 21 generally surrounds the engine 10 and defines the intake 12.

The gas turbine engine 10 works in the conventional manner so that air entering the intake 12 is accelerated by the propulsive fan 13 to produce two air flows: a first air flow into the intermediate pressure compressor 15 and a second air flow which passes through a bypass duct 22 to provide propulsive thrust. The intermediate pressure compressor 15 compresses the air flow directed into it before delivering that air to the high pressure compressor 16 where further compression takes place.

The compressed air exhausted from the high-pressure compressor 16 is directed into the combustion equipment 17 where it is mixed with fuel and the mixture is combusted. The resultant hot combustion products then expand through, and thereby drive the high pressure turbine 18 and intermediate pressure turbine 19 before being exhausted through the nozzle 20 to provide additional propulsive thrust. The high pressure turbine 18 and the intermediate pressure turbine 19, respectively, drive the high pressure compressor 16 and the intermediate pressure compressor 15, each by suitable interconnecting shaft assembly.

An intermediate pressure shaft 109 also drives the propulsive fan 13 via the gearbox 14. The gearbox 14 is a reduction gearbox in that it gears down the rate of rotation of the propulsive fan 13 by comparison with the intermediate pressure compressor 15 and intermediate pressure turbine 19.

The gearbox 14 is an epicyclic planetary gearbox having a static ring gear, rotating and orbiting planet gears supported by a planet carrier and a rotating sun gear 111.

The embodiment shown in FIG. 1 has a specific shaft arrangement which is understood not to be limiting. The embodiments described in the following can also work with a 2- or 3-shaft arrangement.

As shown in FIG. 1, geared turbofan engines 10 are known in the art. With increasing power ratings and/or increasing diameters of the propulsive fans 13, the loads on the gas turbine engines 10 are increasing. Therefore, it seems advisable to introduce measures to counteract potential failure modes or extreme events such as e.g. a fan blade off, a core blade off, a bird strike, a mainline bearing seizure or a gearbox 14 seizure. Some of such failure modes will be described below.

The counter measures to the failures comprise at least one form locking connection device 61, 62 enabling a controlled disengagement of at least one engine part from the drive train. The drive train comprises e.g. the shafts (e.g. a thrust shaft 104, FIG. 2) leading from the turbines 18, 19 to the compressors 15, 16, the gearbox 14 and the propulsive fan 13. Further details of the drive train in the embodiments will be shown below.

Figure 2:
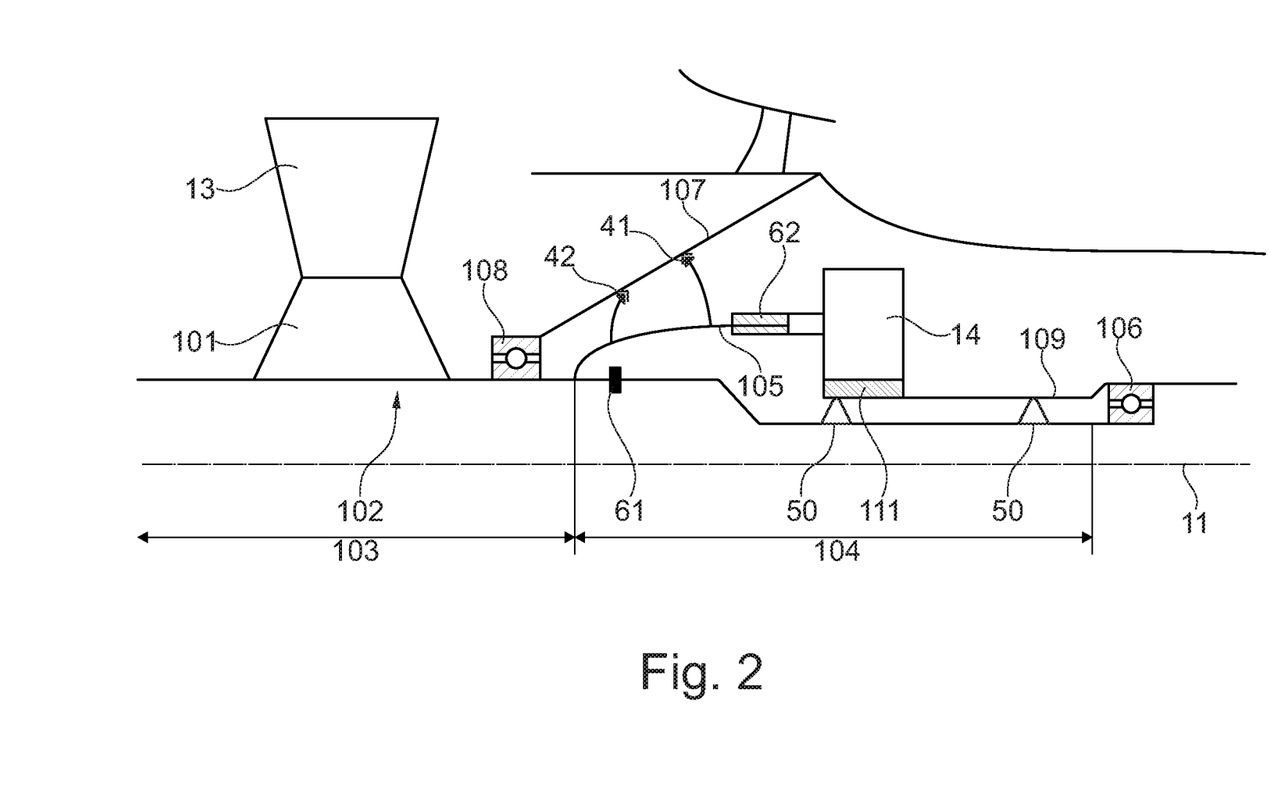
FIG. 2 shows a cross-sectional view of a first embodiment of a gas turbine engine.
Figure 3:
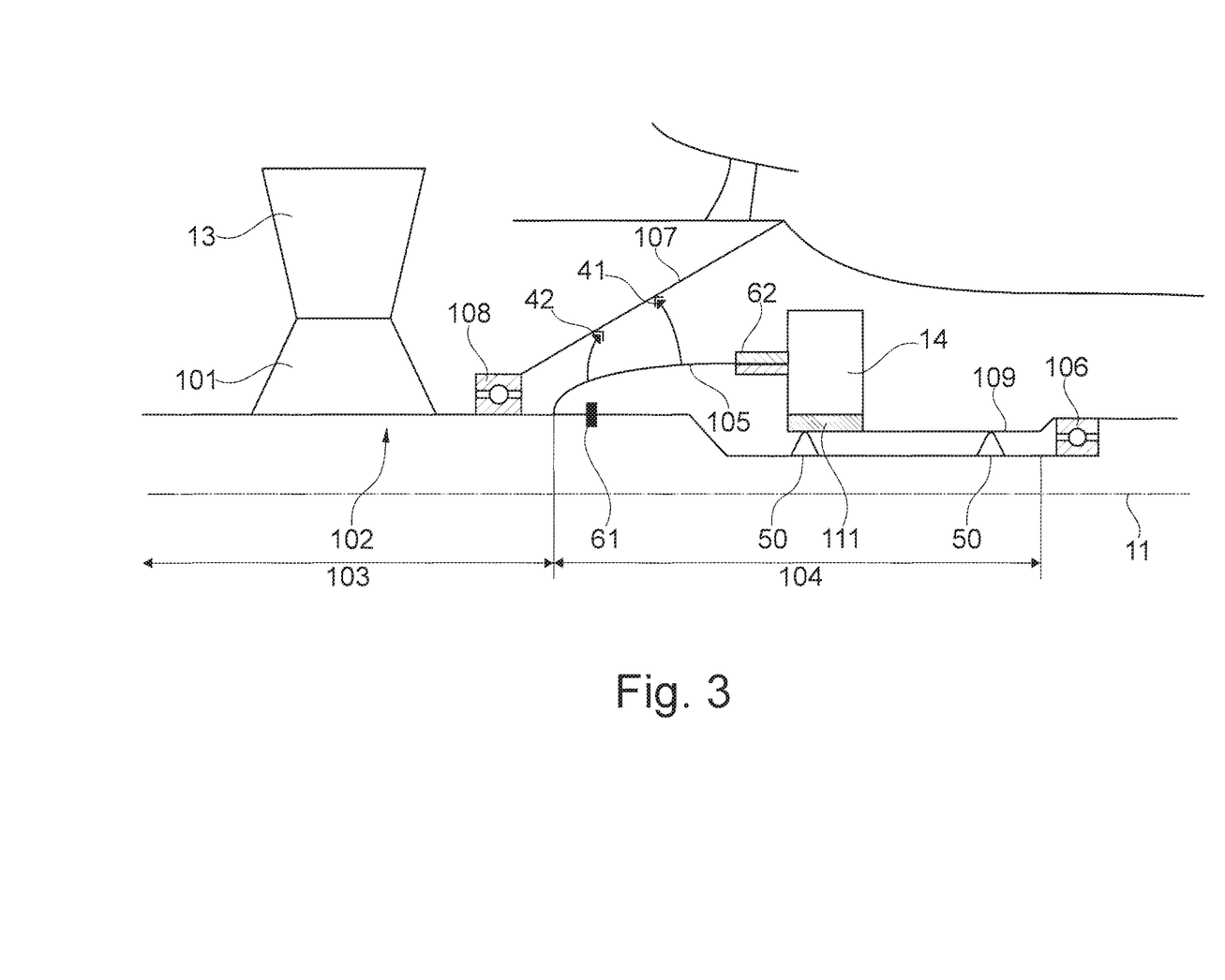
FIG. 3 shows a cross-sectional view of a second embodiment of a gas turbine engine in an engaged position.
Figure 3A:
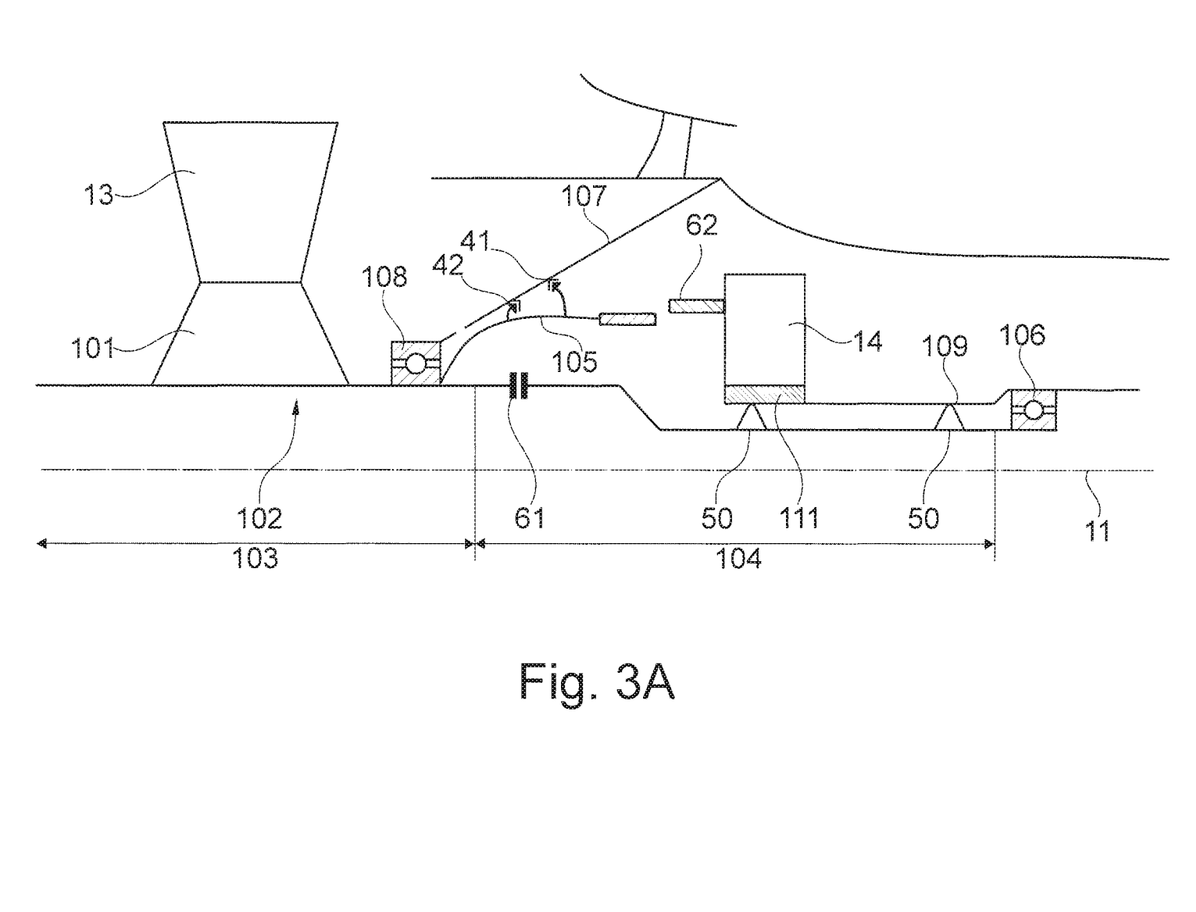
FIG. 3A shows the second embodiment in a disengaged position.
Figure 4:
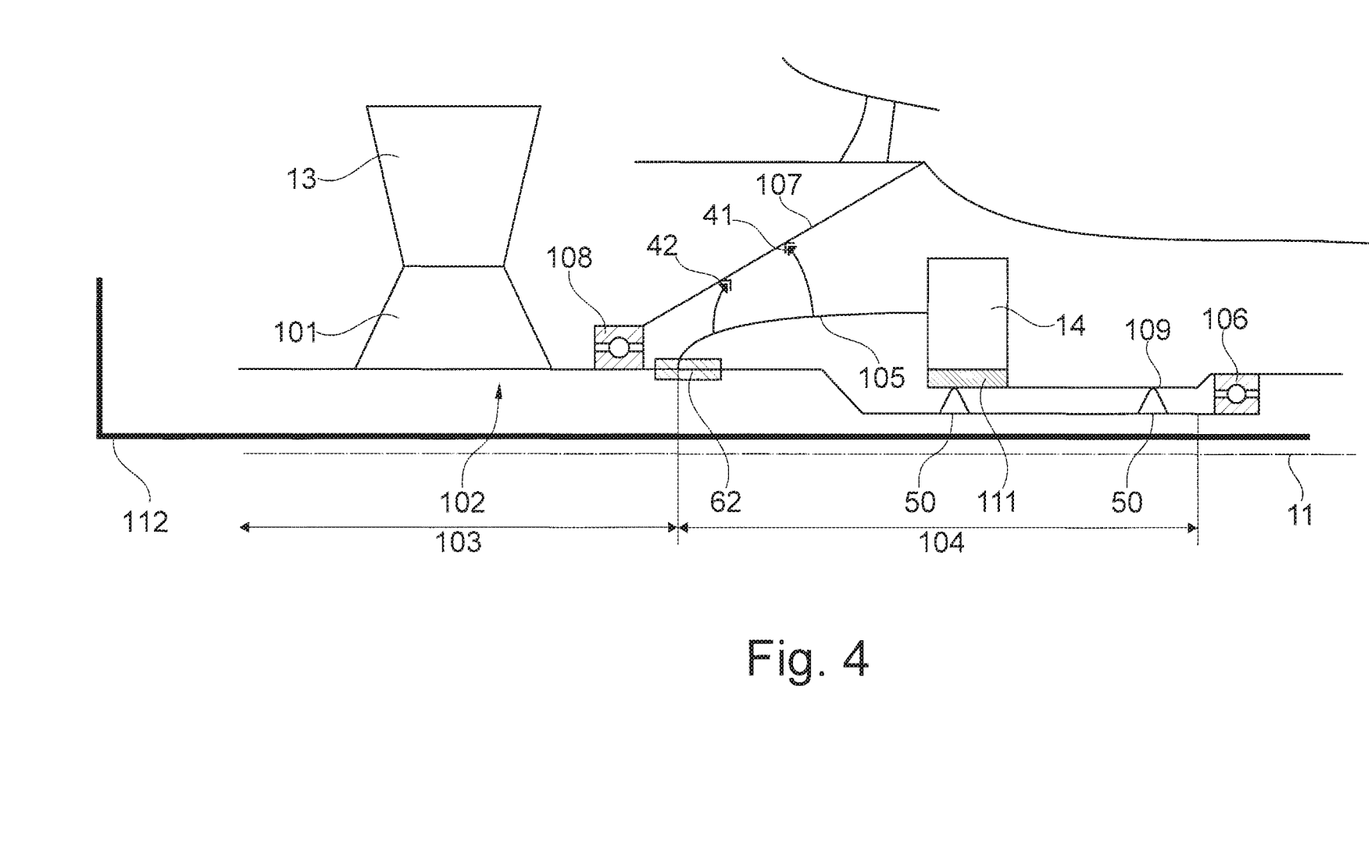
FIG. 4 shows a cross-sectional view of a third embodiment of a gas turbine engine in an engaged position.

In FIGS. 2 to 4 (only one blade partly shown) the propulsive fan 13 is driven by the output of the gearbox 14 via a shaft 102, the shaft 102 being a part of the drive part assembly.

The shaft 102 comprises several parts, in particular a fan shaft 103 and a thrust shaft 104. Furthermore, a torque bearing coupling 105—also being a part of the shaft 102—is connecting the shaft 102 with the gearbox 14 at the junction between the fan shaft 103 and the thrust shaft 104.

The gearbox 14 is only shown schematically in FIGS. 2 to 6 with a sun gear 111 around the thrust shaft 104.

Under nominal operation the thrust shaft 104 as a part of the shaft 102 does not carry torque, just bending moments and thrust loads. Under nominal operation thrust loads and bending moments are carried by the fan shaft 103, the thrust shaft 104, an intershaft bearing 106 eventually to a pylon (not shown in the figures) of the gas turbine engine 10.

The torque load is transmitted from the gearbox 14 via the dome-shaped torque bearing coupling 105 to the fan shaft 103, then to the fan disk 101 and the propulsive fan 13. Therefore, the drive train from gearbox 14 towards the front of the gas turbine engine 10 comprises the torque bearing coupling 105, the fan shaft 103 and the fan disk 101. In other embodiments, the torque bearing coupling 105 can have a different shape than the one shown here.

A front bearing cone 107 encloses in particular the gearbox 14 and the torque bearing coupling 105.

The releasing (i.e. the opening) of the first and second from locking device connection 61, 62 (e.g. a clutch and a spline connection) disengages the propulsive fan 13 from the gearbox 14. Therefore, the load due to the failure can be bypassed to other structural parts.

In the embodiment shown in FIG. 2, two form locking connection devices 61, 62 are shown.

The first form locking connection device 61 is designed as a clutch to release, i.e. to open the connection under a defined load (i.e. torque). This leads to the intended disengagement of the rotating parts. A generally known spring loaded clutch, a ratchet clutch or a friction plate clutch can be used as a clutch.

The second form locking connection device 62 is designed as a spline connection. In the event that the clutch 62 is released (e.g. a gearbox 14 seizure), or in the event that the thrust shaft 104 fails, the spline connection 61 releases under axial load, not torque. Under a fan blade off event, either the clutch 61 releases due to high bending moments or the clutch 61 releases due to high torque or the spline 62 is released and the clutch 61 releases due to axial loads.

In either case the torque bearing coupling 105, the thrust shaft 104 and/or the front bearing cone 107 are deliberately disengaged by the form locking connection devices 61, 62 to allow a defined opening of the connection under a defined load. It should be noted that not all embodiments require to have the one clutches 61 and one spline connection 62.

The gearbox 14 is only shown schematically in FIG. 2 with the sun gear 111 around the thrust shaft 104.

Furthermore, in FIG. 2 two load stops 41, 42 are schematically shown in addition to the form locking connection elements 61, 62. The first load stop 41 comprises an angled structure (one arm pointing in axial direction backwards, one arm pointing radially inwards) mounted or integral with the front bearing cone 107. Radially inwards a matching structure (one arm pointing in axial direction backwards, one arm pointing radially inwards) is mounted or integral with the torque bearing coupling 105.

If the first and second form locking connection devices 61, 62 are opened (i.e. due to a threshold exceeding torque), the torque bearing coupling 105—together with the fan shaft 103 and the propulsive fan 13—will have some radial and axial movement. The angled structure of the first load stop 41 controls the radial and axial movement of those parts because of a form-locking effect when the two parts of the angled structures 41 are moved together after the mechanical failure.

The second load stop 42 also comprises an angled structure. The one part mounted or integral with the front bearing cone 107 has one arm pointing in the axial forward position, one arm pointing in the radial inward direction. The matching structure to this part is mounted or integral with the torque bearing coupling 105. This second load stop 42 can take an axial load during a windmilling situation after the propulsive fan 13 has been disengaged from the gearbox 14.

In the embodiment shown in FIG. 2 the thrust shaft 104 is contacting guiding means 50 to allow rotation under thrust shaft deflection. The guiding means 50 are e.g. local protrusions or ring-like structures.

In FIG. 3, a part of a gas turbine engine 10 as depicted in FIG. 2 is shown. In principle, reference can be made to the respective description.

In the embodiment shown in FIG. 3, the second form locking connection device 62 is a spline which is connected between the torque bearing coupling 105 and the torque carrier of the gearbox 14. The load stops 41, 42 operate as in the embodiment described in FIG. 2.

In FIG. 3A the embodiment of FIG. 3 is shown in a disengaged position, i.e. the spline as form locking connection 62 is disengaged. The load stops 41, 42 are moved together. The gap in the thrust shaft 104 indicates the activation of the thrust shaft clutch or a thurst shaft 104 break scenario.

In FIG. 4, a variation of the embodiment in FIG. 3 is shown so that the respective description is applicable. Here, the second form locking connection device 62 is also a spline. The spline connection is positioned at the connection of the torque bearing coupling 105 with the thrust shaft 104.

In FIG. 4 a fan catcher 112 also schematically shown. In it extends from the front of the propulsive fan 13 to the intermediated pressure shaft 109.

Figure 4A:
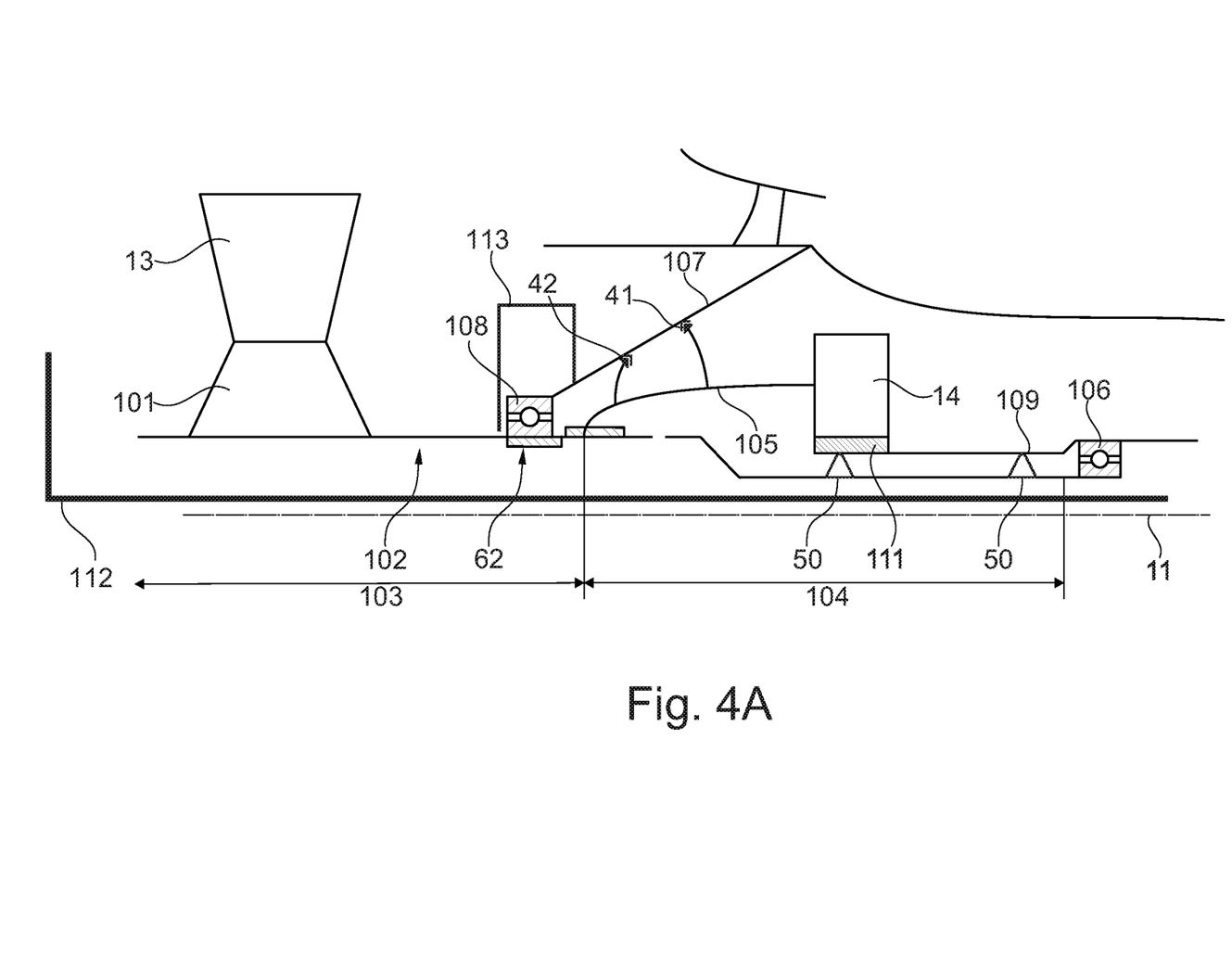
FIG. 4A shows the third embodiment in a disengaged position.

In FIG. 4A, the embodiment of FIG. 4 is shown in a disengaged position, i.e. the spline as form locking connection 62 is disengaged. In addition, an optional restraining device 113 is shown connected to the front bearing cone.

Here the propulsive fan 13 is caught by the fan catcher 112 after the spline connection 62 are disengaged. The fan catcher 112 provides a secondary load path.

In the following, different failure modes are described in particular with reference to FIGS. 2 to 4. It should be noted that the figures show a number of features which do not have to be present in all embodiments at the same time.

1. The first failure mode is a failure of the thrust shaft 104 behind a fan catcher. This failure breaks the rear load path which is carrying fan thrust loads and bending moments. If this failure would not be mitigated this would lead to a damage of the gearbox 14 due to additional loads on the torque path and loss of the propulsive fan 13 from the gas turbine engine 10.

The fan thrust load runs through the torque bearing coupling 105 and pulls the second form locking connection device 62 (e.g. the spline) apart, thereby decoupling the propulsive fan 13 from the drive train, i.e. the torque path through the gearbox 14.

Alternatively, at least one part in the torque path, in particular the first form locking connection device 61 is designed to fail under the load.

The propulsive fan 13 is then retained either through the first load stop 41 at the inside of the front bearing cone 107 as shown e.g. in FIG. 2 or an extension of the front bearing cone 107 in front of the first bearing 108 which can catch the broken shaft 102.

2. The second failure mode is a failure (seizure) of the intershaft bearing 106 resulting in a coupling of the input and output speeds of the gearbox 14 or a failure of a component between the fan shaft 103 and an intermediate pressure shaft 109. In either case the system is subjected to an increased torque.

The form locking connection device 61, e.g. a clutch is designed to release under such a high torque load. The sequence of the controlled disengagement would be the same as the previous failure mode, i.e. the thrust shaft 104 failure. If the intershaft bearing 106 seizes, then the thrust shaft 104 must carry torque, which it is not designed to do. The thrust shaft 104 will therefore break or the clutch will release due to abnormally high torque, and the spline 61 will release either due to axial load from the propulsive fan 13 or due to high torque load.

3. The third failure mode relates to a gear seizure in the gearbox 14. This will lead to a stopping of the propulsive fan 13 with an increasing power plant drag. If unmitigated, this could lead to a stopping of the propulsive fan 13 with an increasing power plant drag, or irresistible structural loads.

Since the thrust shaft 104 has a freely moving end at the intershaft bearing 106, a form locking connection device 62, e.g. a clutch, positioned on the thrust shaft 104 (see FIG. 2) would not experience a torque increase during this event. Therefore, the clutch 62 would need to be actuated (e.g. hydraulically or pneumatically), if it is designed to be actuated under torque load.

An alternative during a seizure event is to couple the clutch clamp force to the event via at least one of the following means:

a. The fan thrust load is used to generate a clamping force. When the propulsive fan 13 stops rotating, the change in axial load disengages the clutch 62.

b. A hydraulic pressure provided by an intermediate pressure shaft driven pump. When the intermediate shaft stops rotating, the clutch 62 disengages.

c. A manual or electronic actuation of the clutch 62 after the event or based on fan speed and other parameter.

4. The fourth failure mode relates to a compressor or turbine lock. When a compressor 15, 16 or turbine 18, 19 seizes the respective shaft stops rotating. Therefore, the sun gear 111, the gearbox 14 and the propulsive fan 13 will stop rotating.

Here, the form locking connection device 62, e.g. a clutch (e.g. ratchet clutch or structured material with directional strength), could be positioned on the torque bearing coupling 105 and connect the torque bearing coupling 105 to the fan shaft 103/thrust shaft 104 via a spline. Under the torque from the locked rotor, the clutch 61 would disengage and the propulsive fan 13, the thrust shaft 104 and the torque bearing coupling 105 can continue to rotate.

5. The fifth failure mode relates to a fan blade off scenario under which high lateral loads could be transmitted through the first bearing 108 into the front bearing cone 107, through the fan shaft 103 into the gearbox 14 and through the thrust shaft 104 to the intershaft bearing 106 and beyond. The thrust shaft 104 deflection under this scenario could cause clashing with the sun gear 111 of the gearbox 14, leading to sparks, oil fire and failure of the central shaft. The loads may also damage the gearbox 14 and preventing the propulsive fan 13 from windmilling. Under this failure mode, activation of the clutch 62 would disconnect the load path between the propulsive fan 13 and the gearbox 14, avoiding high loads being transmitted to the gearbox 14 and avoiding high deflections of the thrust shaft.

It should be considered that the form locking connection devices 61, 62 should be sufficiently strong under a bird strike. The loads (i.e. the threshold release loads of the form locking connection devices 61, 62) need to be sufficiently high for the other failure modes so that they do not break or release under a bird strike alone. The gas turbine engines 10 need to be able to run on partial power.

LIST OF REFERENCE NUMBERS 10 gas turbine engine
11 principal rotational axis
12 air intake
13 propulsive fan
14 gearbox, power gearbox
15 intermediate pressure compressor
16 high-pressure compressor
17 combustion equipment
18 high-pressure turbine
19 intermediate-pressure turbine
20 exhaust nozzle
21 fan casing
22 by-pass duct
41 first load stop
42 second load stop
50 guiding means (bumpers)
61 first form locking connection device
62 second form locking connection device
101 fan disk
102 shaft
103 fan shaft
104 thrust shaft 105 torque bearing coupling of gearbox to thrust shaft
106 intershaft bearing
107 front bearing cone
108 first bearing
109 intermediate pressure shaft
110 intermediate pressure thrust bearing
111 sun gear of power gearbox
112 fan catcher
113 restrain device

The invention claimed is:

1. A gas turbine engine, comprising:
a turbine,
a propulsive fan,
a shaft including a fan shaft,
a geared turbofan arrangement with a gearbox in a drive train driven by the turbine,
a torque bearing coupling connecting a driving side of the gearbox with the propulsive fan via the fan shaft,
at least one form locking connection device in the drive train enabling a controlled disengagement of at least one engine part from the drive train in case of a mechanical failure of the gas turbine engine and wherein the at least one form locking connection device is positioned between the torque bearing coupling of the gearbox and a torque carrier of the gearbox, and
at least one load stop for bearing an axial load in case of the mechanical failure of the gas turbine engine.

2. The gas turbine engine according to claim 1, wherein the at least one form locking connection device is a clutch connection or a spline connection.

3. The gas turbine engine according to claim 2, wherein the at least one form locking connection device is the clutch connection and wherein the clutch connection is releasable through at least one chosen from a torque above a threshold value, a change in a direction of the torque, a hydraulic pressure and an electronic activation.

4. The gas turbine engine according to claim 1, wherein the at least one load stop is configured for at least one chosen from retaining the propulsive fan in the gas turbine engine and directing loads away from the gearbox.

5. The gas turbine engine according to claim 1, wherein the shaft further includes a thrust shaft, and further comprising guiding surfaces positioned on at least one chosen from the thrust shaft and a further structure to engage the thrust shaft, thereby allowing rotation of the thrust shaft under deflection of the thrust shaft.

6. A gas turbine engine, comprising:
a turbine,
a propulsive fan,
a shaft including a fan shaft and a thrust shaft,
a geared turbofan arrangement with a gearbox in a drive train driven by the turbine,
a torque bearing coupling connecting a driving side of the gearbox with the propulsive fan via the fan shaft,
at least one form locking connection device in the drive train enabling a controlled disengagement of at least one engine part from the drive train in case of a mechanical failure of the gas turbine engine and wherein the at least one form locking connection device is positioned in the thrust shaft behind a fan catcher, and
at least one load stop for bearing an axial load in case of the mechanical failure of the gas turbine engine.

7. The gas turbine engine according to claim 6, wherein the at least one form locking connection device is a clutch connection or a spline connection.

8. The gas turbine engine according to claim 7, wherein the at least one form locking connection device is the clutch connection and wherein the clutch connection is releasable through at least one chosen from a torque above a threshold value, a change in a direction of the torque, a hydraulic pressure and an electronic activation.

9. The gas turbine engine according to claim 6, wherein the at least one load stop is configured for at least one chosen from retaining the propulsive fan in the gas turbine engine and directing loads away from the gearbox.

10. The gas turbine engine according to claim 6, and further comprising guiding surfaces positioned on at least one chosen from the thrust shaft and a further structure to engage the thrust shaft, thereby allowing rotation of the thrust shaft under deflection of the thrust shaft.

11. A gas turbine engine, comprising:
a turbine,
a propulsive fan,
a shaft including a fan shaft,
a geared turbofan arrangement with a gearbox in a drive train driven by the turbine,
a torque bearing coupling connecting a driving side of the gearbox with the propulsive fan via the fan shaft,
at least one form locking connection device in the drive train enabling a controlled disengagement of at least one engine part from the drive train in case of a mechanical failure of the gas turbine engine,
at least one load stop for bearing an axial load in case of the mechanical failure of the gas turbine engine, and
wherein the at least one load stop is positioned between the torque bearing coupling between the gearbox and the fan shaft to engage a moving part of the gas turbine engine after the mechanical failure.

12. The gas turbine engine according to claim 11, wherein the at least one form locking connection device is a clutch connection or a spline connection.

13. The gas turbine engine according to claim 12, wherein the at least one form locking connection device is the clutch connection and wherein the clutch connection is releasable through at least one chosen from a torque above a threshold value, a change in a direction of the torque, a hydraulic pressure and an electronic activation.

14. The gas turbine engine according to claim 11, wherein the at least one load stop is configured for at least one chosen from retaining the propulsive fan in the gas turbine engine and directing loads away from the gearbox.

15. The gas turbine engine according to claim 11, wherein the shaft further includes a thrust shaft, and further comprising guiding surfaces positioned on at least one chosen from the thrust shaft and a further structure to engage the thrust shaft, thereby allowing rotation of the thrust shaft under deflection of the thrust shaft.

* * * * *